Figure 1:
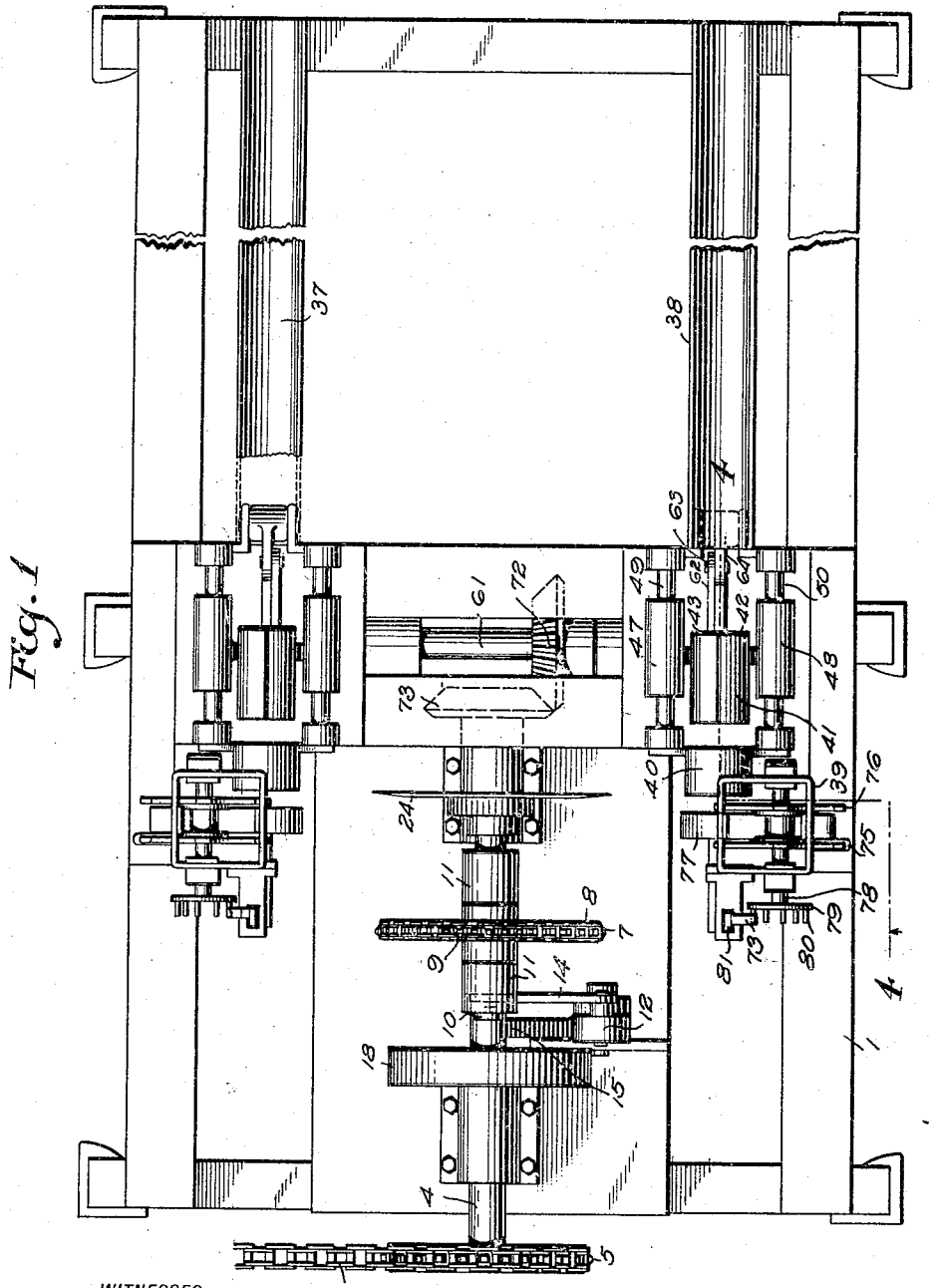

A. M. AUGENSEN.
SAUSAGE CANNING MACHINE.
APPLICATION FILED JUNE 19, 1915.

1,200,449.

Patented Oct. 10, 1916.

5 SHEETS—SHEET 1.

WITNESSES:

INVENTOR
A. M. Augensen
BY
ATTORNEY

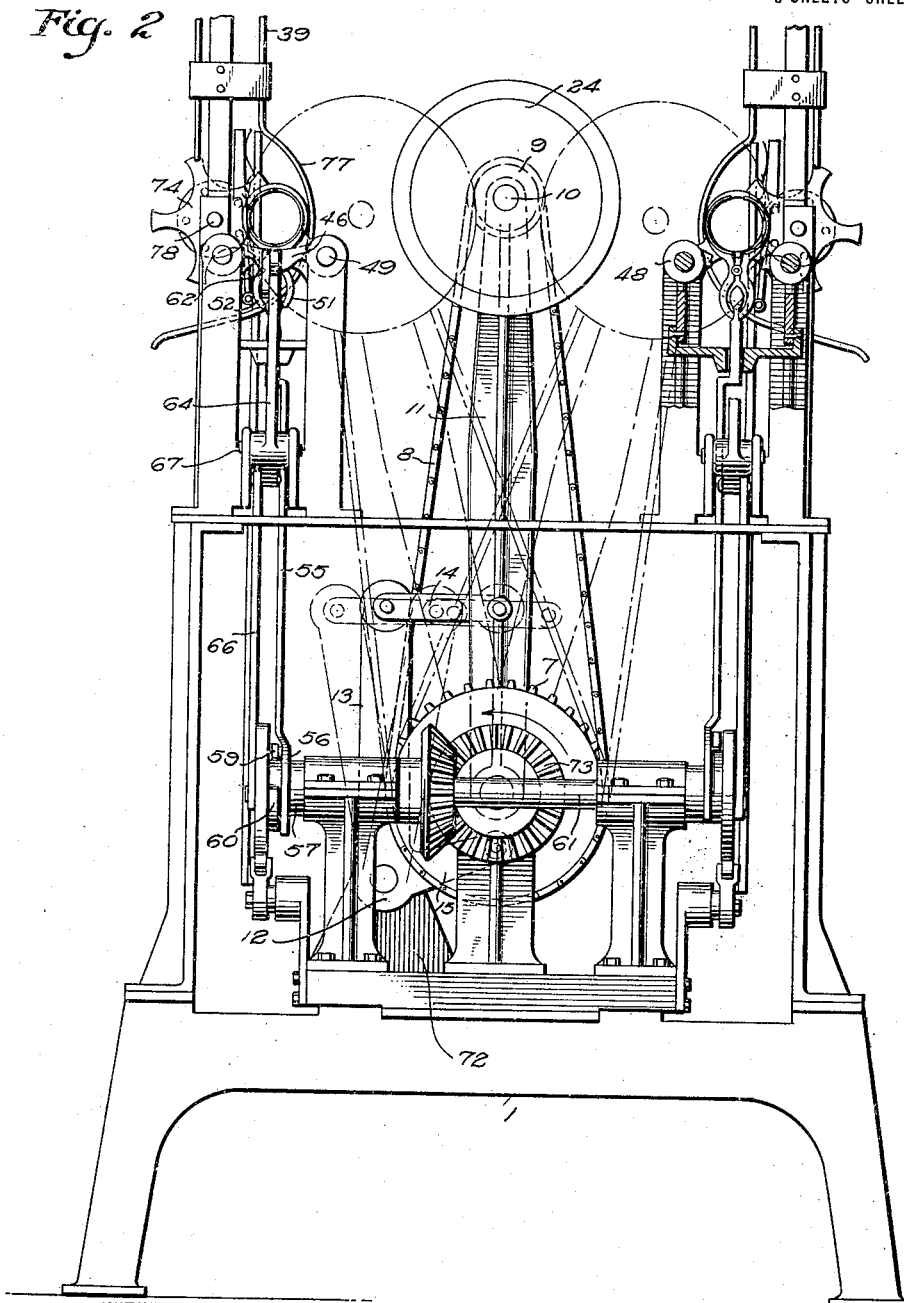

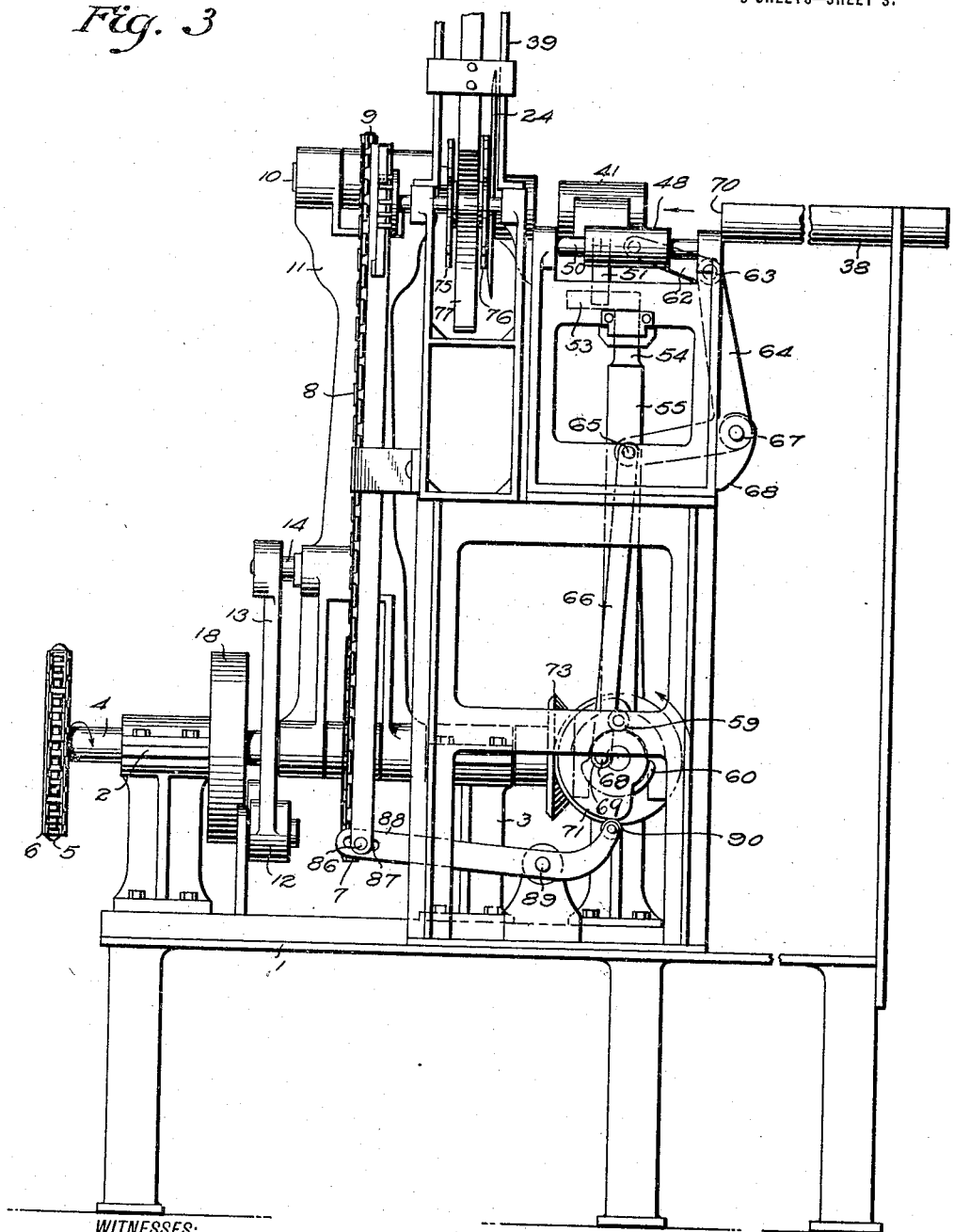

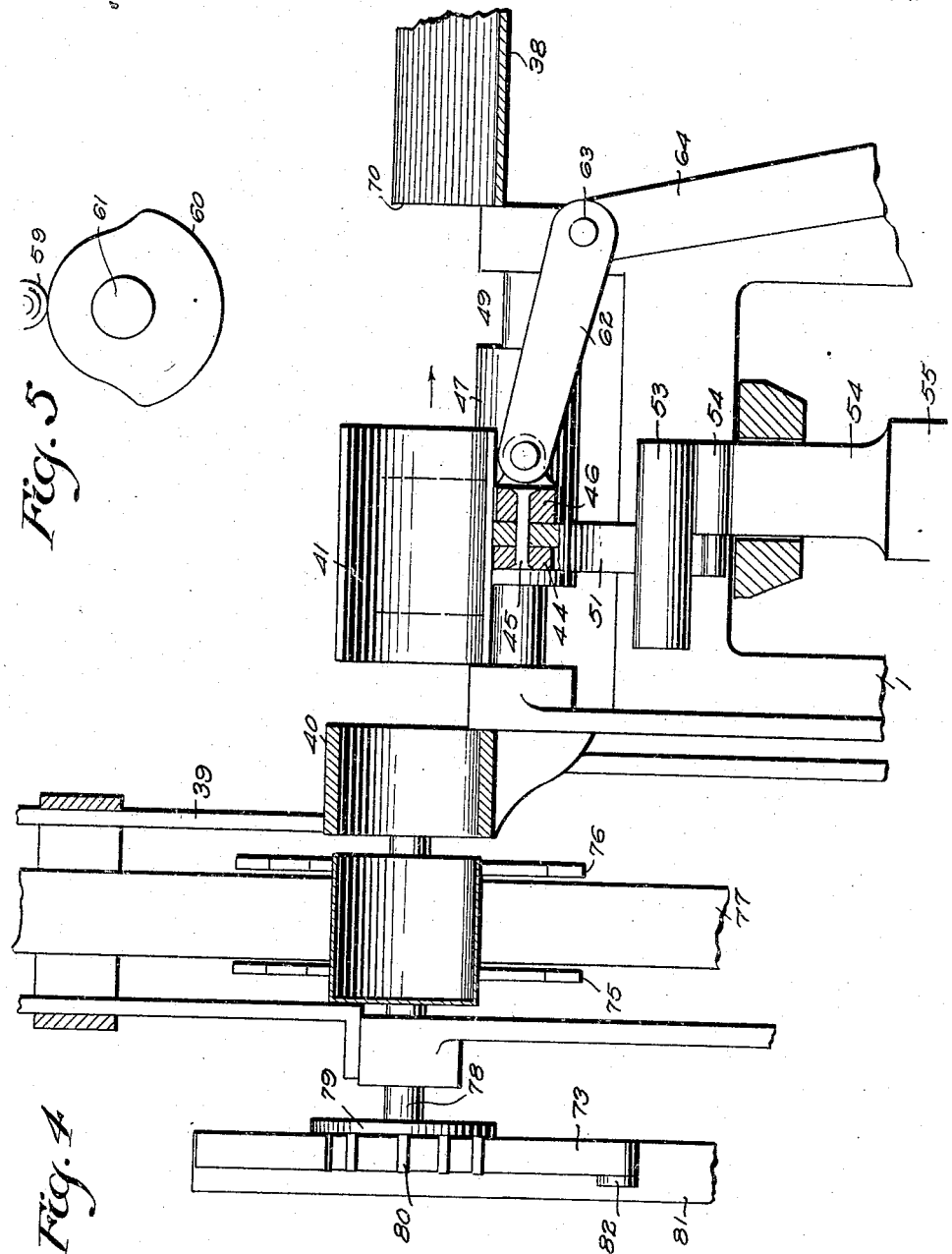

A. M. AUGENSEN.
SAUSAGE CANNING MACHINE.
APPLICATION FILED JUNE 19, 1915.
1,200,449. Patented Oct. 10, 1916.
5 SHEETS—SHEET 5.
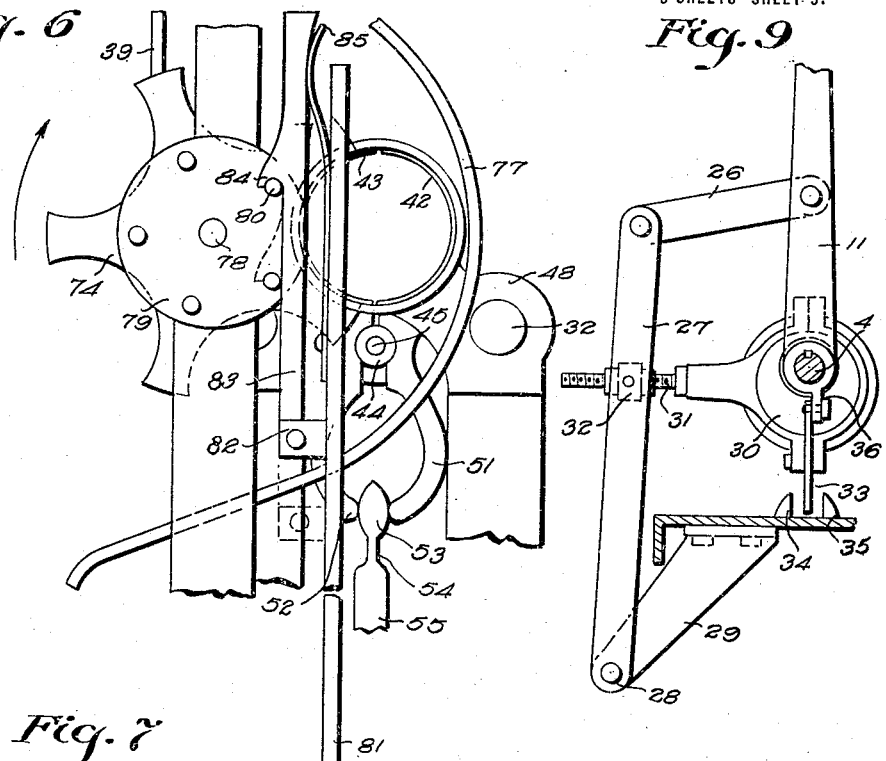
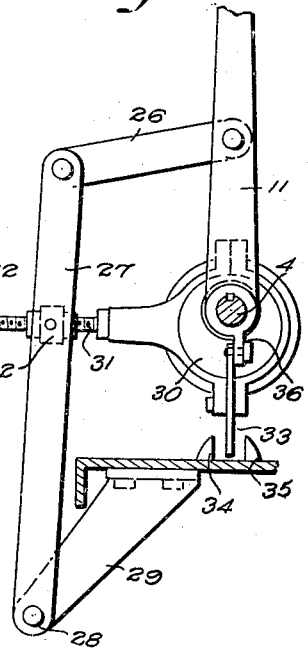
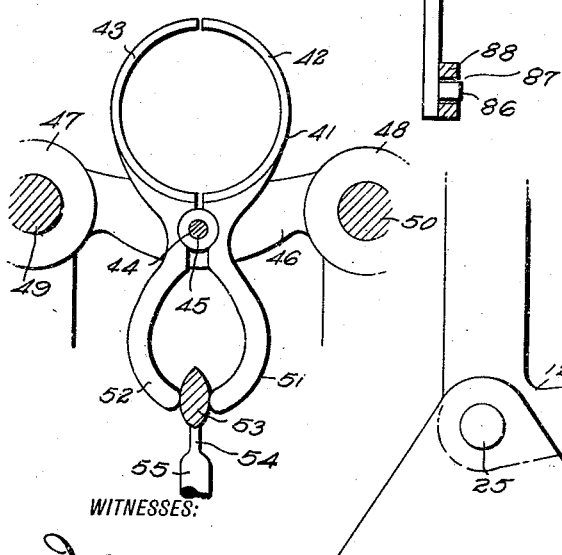
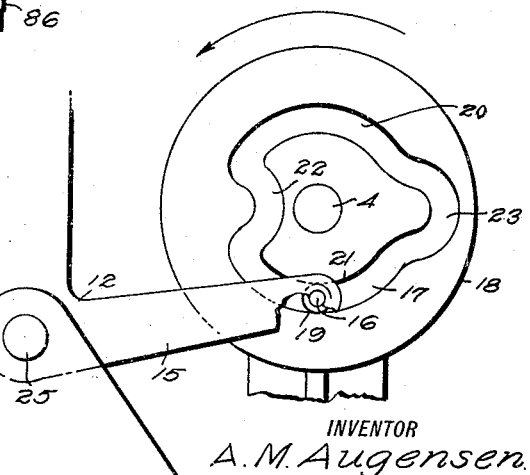
WITNESSES:
INVENTOR
A. M. Augensen
BY
ATTORNEY

UNITED STATES PATENT OFFICE.

AUGUST M. AUGENSEN, OF MAYWOOD, ILLINOIS.

SAUSAGE-CANNING MACHINE.

1,200,449.  Specification of Letters Patent.  Patented Oct. 10, 1916.

Application filed June 19, 1915. Serial No. 35,063.

*To all whom it may concern:*

Be it known that I, AUGUST M. AUGENSEN, a citizen of the United States, and a resident of Maywood, in the county of Cook and State of Illinois, have invented a new and Improved Sausage-Canning Machine, of which the following is a full, clear, and exact description.

This invention relates to machines for placing sausage and the like in cans, bottles, jars or other receptacles and has for an object to provide an improved machine of this character which will place the correct amount in receptacles in comparatively quick succession and automatically.

Another object in view is to provide a machine for placing sausage in cans, the structure being such as to provide an intermittent feed on each side of the machine and means for alternately severing the sausage into proper length for cans or other receptacles as the same are moved through the machine.

A further object of the invention is to provide sausage receiving troughs and gripping means adapted to move back and forth and engage at different points the sausage so as to intermittently feed the same forward as the receptacles for receiving the sausage are fed through the machine.

In the accompanying drawings:—Figure 1 is a top plan view of a machine embodying the invention; Fig. 2 is a rear view of the machine shown in Fig. 1, certain parts being broken away for better illustrating the construction; Fig. 3 is a side view of the structure shown in Fig. 1; Fig. 4 is an enlarged fragmentary sectional view through Fig. 1 on line 4—4; Fig. 5 is a detail fragmentary side elevation of a cam and associated parts embodying certain features of the invention; Fig. 6 is an enlarged detail fragmentary elevation of a can feeding mechanism embodying certain features of the invention; Fig. 7 is a fragmentary sectional view through the sausage gripping and feeding mechanism; Fig. 8 is an enlarged fragmentary side view of the cutter operating cam and associated parts; Fig. 9 is a fragmentary sectional view of a slightly modified form of cutter operating mechanism to that shown in Fig. 8.

Referring to the accompanying drawings by numerals, 1 indicates a frame of any suitable kind for receiving the moving parts of the machine. Arranged on the frame 1 are supporting journal boxes 2 and 3 for receiving the power shaft 4, which shaft is driven by any suitable means, as for instance a sprocket 5 and chain 6. Shaft 4 has rigidly connected therewith a sprocket wheel 7 on which is mounted a chain 8, which chain also passes over the small sprocket 9 on shaft 10, which shaft is supported by a lever 11. Lever 11 (Fig. 3) is journaled on shaft 4 and is operated by the bell crank 12, arm 13 of which engages and imparts movement to lever 11 through link 14, which link is pivotally connected with arm 13 and with lever 11, as shown in Fig. 2. The arm 15 of lever 11 carries a pin 16 projecting into the cam groove 17 of the cam 18 whereby the bell crank lever 12 is properly operated for swinging the lever 11 back and forth. The pin 16 is provided with an anti-friction roller 19 so as to make the action of these parts more even, as this roller must follow the cam groove 17 which is provided with arc-shaped sections 20 and 21 and depressed sections 22 and 23. When the pin is in either of the sections 20 or 21 the lever 11 is held in a neutral central position, as shown in full lines in Fig. 2, while the sections 22 and 23 are of such a depth as to cause the arm to move to either of the dotted positions shown in Fig. 2 and thus cause the knife or cutter 24 to cut the sausage, meat or other matter being forced into the cans fed to the machine.

It is to be noted that the bell crank lever 12 is pivotally mounted at 25 on a suitable support connected with the frame 1. The knife or cutter 24 is in the form of a disk and is rigidly secured to the shaft 10, which is mounted on lever 11, so as to be moved back and forth, as shown by dotted lines in Fig. 2. Sprocket 9 is rigidly secured to shaft 10 so as to continually rotate the same while the machine is in operation and thus give the cutter 24 a continuous movement. In this connection attention is called to Fig. 9 wherein a slightly modified form of operating means for the lever 11 is presented. This operating means comprises a link 26 pivotally mounted on the lever 11 and also pivotally mounted to an auxiliary link 27. The auxiliary link 27 is pivotally mounted at 28 to a bracket 29 rigidly secured to the frame 1. Instead of using the cam 18 as shown in Fig. 8 an eccentric 30 is secured to shaft 4 which moves the rod 31 back and forth, said rod being adjustably connected to a suitable bracket 32 mounted on the auxiliary link 27. When the eccentric 30 rotates the links 26 and 27 are operated so as to swing the knife back and forth. A spring 33 is connected with the lever 11 in this form of the invention and is caused to engage either of the stops 34 or 35 so as to assist in causing the lever 11 to begin its return movement properly. It will be noted that the lever 11 in this form of the invention is provided with an extension or lug 36 to which spring 33 is bolted so that the spring will be in proper position for correctly operating at all times.

As shown more particularly in Figs. 1 and 2 it will be seen that the device is arranged of duplicate constructions so that a single knife 24 will operate upon two stuffing or canning mechanisms. Troughs 37 and 38 are provided, the same being of similar construction and designed to receive the sausage in considerable length and of substantially the proper diameter for filling the cans or other receptacles. A chute or guide 39 is provided for feeding or directing the cans to a point in front of the trough 38 and in line with the feed guide 40 which is stationary. In order to properly feed the sausage from trough 38 to the can or other receptacle opposite guide 40 a gripping and feeding mechanism 41 is provided which successively grips the sausage from trough 38 and moves the same forwardly step by step, each movement being equal to the depth of the can or other receptacle being filled.

The feeding mechanism is provided with jaws 42 and 43 (Fig. 7) hinged together at 44, the pintle 45 being connected with a cross bar 46 which cross bar 46 is provided with bearing members 47—48 so as to freely slide upon the guide rods 49 and 50 mounted on suitable supporting brackets forming part of the frame 1. From the hinge 44 the jaws 42 and 43 merge into arms 51 and 52. A spreading member 53 substantially oval in cross section is provided which may be moved to the position shown in Fig. 7 when the jaws 42 and 43 are in their closed or gripped position and may be moved so that the neck 54 will be opposite the lower end of the arms 51 and 52 so as to release the jaws. The spreading member 53 and neck 54 are formed integral with the rod 55, or if desired may be secured thereto, the spreading member 53 being of substantially the same length as the movement of the jaws 42 and 43 so that it may act at any time. The rod 55 extends downwardly, as shown in Figs. 2 and 3, and is bifurcated at 56 so as to straddle the member 57 which is cylindrical. A pin 58 is secured to the rod 55 and carries a roller 59 which is adapted to engage the cam surface 60 when the same is rotated and thereby raise rod 55 once for each revolution of the auxiliary power shaft 61. It will be observed that by the shape of the cam face 60 the jaws 42 and 43 will remain open for approximately half the time and closed for approximately half the time.

In order to give the jaws a back and forth movement a link 62 is provided which is pivotally connected with the cross bar 46 and also pivotally connected at 63 to one arm of the bell crank lever 64. The other arm of the bell crank lever 64 is pivotally connected at 65 to a link 66, while the bell crank lever itself is pivotally mounted at 67 on a suitable bracket 68 connected with the frame 1. The link 66 is pivotally connected with the face of cam 60 by a pin 69, which pin or stud rotates or moves around the shaft 61 as said shaft is rotated and thereby produces a continuous back and forth movement of the jaws 42 and 43. The position of the cam face 60 on cam 57 is such as to close the jaws 42 and 43 when the same are at the end of their travel and positioned adjacent the inner end 70 of trough 38. The jaws are held closed until the same reach the extremity of their travel or movement toward the guide 40, whereupon they are opened and remain open until they arrive adjacent the end 70, whereupon they are closed previous to their further return movement. Each time that the jaws move forwardly the sausage or other matter arranged in trough 38 will be moved forwardly and a section thereof will be severed by the cutter 24. In connection with the cam 57 and associated parts just described it will be observed that the cam 57 includes the face 60 and the cam face 71 which is rigidly secured by any suitable means, as for instance by a key, to the auxiliary power shaft 61, which power shaft receives its motion from gear 72 meshing with gear 73 secured to shaft 4.

Referring more particularly to Figs. 2, 3, 4 and 6, it will be seen that means have been provided for feeding in proper succession a number of receptacles to a position in front of the guide 40. The guide 39 may be of any suitable material, preferably a plurality of strips of material producing a guiding frame for directing the cans to a feeding wheel 74. The feeding wheel 74 is constructed from disks 75 and 76 having notches arranged therein so as to readily receive the cans as the same move down the guide 39. One of the guiding strips of the guide 39 is bowed or formed so as to produce a loop 77 that guides the cans passed to the guide 40 so that the cans when filled may be discharged at a suitable point. The notched disks 75 and 76 forming the wheel 74 are rigidly secured to shaft 78, which shaft is journaled on suitable journal members so that the same may be freely rotated by a pinwheel 79 rigidly secured to shaft 78. The pinwheel 79 is provided with a plurality of spaced pins 80, there being one pin 80 for each notch of the wheel 74.

Preferably the cans are moved downwardly through chute or guide 39 by gravity so that there is a can resting in the uppermost notch of wheel 74 at all times ready to be moved around in front of the guide 40, as shown in Fig. 4. When a can is in this position the same will remain stationary until the jaws 42 and 43 move over to a point near guide 40, whereupon the desired quantity of sausage is forced into the can and as the jaws move away from the guide 40 the cutter 24 severs the sausage adjacent the top of the can, after which the pinwheel 79 is operated for moving the filled can out of the way and an empty can to the position shown in Fig. 4.

A reciprocating bar 81 is provided adjacent the pin wheel 79 which is formed with an upstanding lug or bracket 82 to which a pawl 83 is pivotally mounted, said pawl 83 being formed with a hook member 84, as shown in Fig. 6, which engages one of the pins 80 and moves the pinwheel one step forward upon each downward movement of the bar 81. On the return upward movement the pawl moves out of the way of the next pin on wheel 79, said movement being against the action of the spring 85 secured to bar 81. By this construction and arrangement the pinwheel is permitted to move forwardly in one direction but the pawl 83 moves out of the way when returning to its original position. The lower end of the bar 81 is provided with a pin 86 fitting in the slot 87 of lever 88. Lever 88 is pivotally mounted at 89 to a suitable support connected with frame 1 and carries at the end opposite slot 87 a bearing roller 90 which is adapted to rotate over the cam face 71, which will move the rod 81 upwardly and hold the same in an elevated position for practically a half revolution of the shaft 61, after which the lever and rod 81 are released and allowed to move downwardly under the action of gravity, thus feeding the filled can to the discharge point and a new can to the filling point. If the action of gravity is not sufficient for moving the rod 81 downwardly a spring or weight could easily be supplied for producing a proper movement, though ordinarily this is not necessary.

The trough 38 and associated parts on that side of the machine have been described in detail. Trough 37 and associated parts on that side of the machine are exactly like trough 38 and associated parts so that no description will be necessary. The cams and various parts being set so as to act alternately with the same parts associated with trough 38. It will be noted that the cutter 24 will alternately swing from side to side, as shown in Fig. 2, and cut the sausage or other matter being forced into the cans after the feeding operation has been completed on that particular side. The sausage must be manually placed in troughs 37 and 38 and moved until it is grasped by the jaws 42 and 43, whereupon the remaining movement of the sausage is automatic. Lengths may be placed in the troughs and moved manually until the same have been gripped by the feeding mechanism 41. Aside from the placing of any lengths of sausage in the troughs 37 and 38 the entire action of moving the sausage, cutting the same and placing the severed sections in the cans, is automatic. The sausage is of course placed in the cans previous to the severing thereof so that by properly adjusting the parts the same may be forced into the can with some appreciable pressure if desired and thereby cause the sausage to be properly packed. The term sausage has been used in this specification, but it will be evident that any meat or composition of meat may be packed in cans, so that the term sausage is intended to cover any of these ingredients as well as the conventional sausage. It will also be evident that a single sausage of an appreciable diameter may be used, or a large number of sausages of small diameter may be used without departing from the spirit of the invention. When a number of small sausages are used the jaws will grasp the same and will properly force the various sausages through the guide into the can.

In order that the can in wheel 74 will be properly held in alinement with the guide 40, the particular construction and arrangement of pawl 83 and associated parts present means for not only moving the wheel 74 but for locking the wheel 74 so that the can therein will be centered properly. This is done by having the pawl provided with a hook 84 sufficiently deep to accommodate half of the various pins 80 so that when the parts are moved to the dotted position shown in Fig. 6, namely the extreme downward stroke, the pin 80 cannot turn any farther because the next pin above strikes against the straight part of the pawl above the hook and causes a lock or positive stop. This effectually prevents shaft 78 and wheel 74 and associated parts from moving while the sausage is being forced into the can.

What I claim is—

1. In a sausage filling machine of the character described, a sausage guide, a trough for receiving sausage, means for moving and holding a receptacle in alinement with said sausage guide, a pair of jaws adjacent said trough, means for opening and closing said jaws intermittently, means for moving said jaws when closed forwardly for feeding sausage in said guide toward the means for holding the receptacle in place, whereby the successive receptacles are successively filled, and means for severing the sausage immediately after the filling of each receptacle.

2. In a sausage canning machine of the character described, a trough for receiving a length of sausage, a pair of reciprocating clamping jaws, means for operating said jaws so as to grip said length of sausage successively and feed the same forward step by step, means for guiding a receptacle to a point in front of the sausage, whereby said jaws will force the sausage into said receptacle, and means for severing the sausage adjacent the receptacle immediately after the sausage has been forced into the receptacle.

3. In a sausage canning machine of the character described, a support for receiving a length of sausage, means for guiding a can or other receptacle to a point in front of said support, a feeding mechanism for feeding said length of sausage forward so that the end thereof will be forced into said can, said feeding mechanism including a pair of gripping jaws, means for opening and closing the same, and means for reciprocating the jaws, and a cutter positioned so as to cut the length of sausage adjacent said can immediately after the can has been filled.

4. In a sausage canning machine of the character described, means for receiving and supporting a length of sausage, means for moving and holding a can in front of the supporting means, feeding mechanism for moving said length of sausage intermittently, said feeding mechanism including a pair of pivotally mounted gripping jaws, a movable cam member for opening and closing said jaws, means for moving said jaws in one direction when open and in the opposite direction when closed, a power member for operating said means, and a cutter operating in timed relationship to the movement of said feeding mechanism, whereby the length of sausage is severed immediately after a section thereof has been forced into a can.

5. In a canning machine of the character described, feeding mechanism, means operating in timed relationship to the feeding mechanism for cutting the matter being fed into lengths, a guide or chute for directing the can to a position opposite said feeding mechanism, a rotating wheel provided with notches for receiving said cans, a pinwheel for operating said notched wheel so as to intermittently operate the notched wheel and thereby feed the cans past said feeding mechanism with a motion which will allow a brief stop in front of the feeding mechanism so as to receive the material being fed, a reciprocating pawl adapted to engage successively the pins of said pinwheel, and means for operating said reciprocating pawl in timed relationship to the movement of said cutter and the movement of said feeding mechanism.

6. In a can filling machine of the character described, a feeding mechanism, a guide for guiding the material moved by said feeding mechanism, a chute for guiding cans to a position adjacent said guide, a pair of notched wheels adapted to engage said cans successively and move the same to a position in front of said guide and then from the position in front of said guide to a discharge point, the movement of said notched wheel being intermittent, thus giving time for said feeding mechanism to fill the can while opposite said guide, and means operating in timed relationship to said feeding mechanism for intermittently moving said notched wheel.

7. In a can filling machine of the character described, a feeding mechanism for the material to be canned, a can guide or chute, a notched wheel for intermittently moving cans to a position in front of said feeding means, a pinwheel connected with said notched wheel, a hook member arranged to successively engage said pins, a spring for resiliently holding said hook member in the path of said spring, a reciprocating rod for moving said hook member, a lever for moving said rod, a cam for actuating said lever in a predetermined relationship to the movement of said feeding mechanism, and power means for operating said cam.

8. In a can filling machine of the character described, feeding mechanism, means for operating said feeding mechanism, said means including a cam for opening and closing part of the feeding mechanism and a power shaft for moving the feeding mechanism, a chute or guide for cans, an intermittently movable wheel for feeding cans to said guide or chute to a position in front of the feeding mechanism, means for intermittently operating said can feeding member, a lever for actuating said last mentioned means, a cam for actuating said lever, said cam being connected with said power means, and a cutter operated by said power means for cutting in lengths the matter fed to said cans.

9. In a can filling machine of the character described, a feeding member, a can chute, means for moving said can chute to a position in front of the feeding member, a cutter for cutting the matter fed to said cans, said cutter operating immediately after the respective cans are filled, a power member for rotating said cutter, a pivotally mounted arm for supporting the cutter, and means for transmitting motion from said power means to said arm for causing the arm to swing back and forth and thereby cause the cutter to move across the path of movement of the matter being canned at successive intervals.

10. In a can filling machine of the character described, a trough for receiving the material to be canned, a pair of hinged jaws adapted to grip said material intermittently and feed the same forward intermittently, a pair of operating arms extending from said jaws, a cam member adapted to engage said operating arms for closing said jaws, a link mechanism for reciprocating said jaws, means for operating said link mechanism whereby the same is given a continuous movement, a rotating cam for operating said first mentioned cam whereby said jaws are held open during the movement in one direction and held closed during the movement in the opposite direction, means for moving and holding a can in front of said feeding mechanism until the same has been filled, and a cutting member acting in timed relationship to the movement of said feeding mechanism for cutting the material fed to the can immediately after the can has been filled.

11. In a can filling machine of the character described, a supporting member for receiving material to be canned, a pair of jaws arranged adjacent said supporting member, said jaws being hinged together and provided with a pair of actuating arms, a cam acting on said arms, and means for moving said cam so that the arms will be held positively open part of the time and held positively closed part of the time, means for reciprocating said jaws whereby the jaws are caused to secure and hold the matter being canned so as to feed the same forward step by step, means for moving a new can in front of the feeding mechanism immediately before each forward movement of the matter being fed by said feeding mechanism, and a cutter actuated in timed relationship with the feeding mechanism for cutting said matter being canned adjacent the can immediately after the can has been filled.

12. In a can filling machine of the character described, a feeding mechanism provided with a pair of hinged jaws, means for reciprocating said mechanism, means for holding the jaws open when moved in one direction and closing the jaws when moved in the opposite direction, an intermittently movable wheel for moving cans to a position in front of said feeding mechanism so as to receive matter being canned therefrom, a cutter for cutting the matter being canned immediately after each can has been filled, and means for transmitting motion from a continuously operated shaft to said can moving means for actuating the same.

13. In a can filling machine of the character described, a pair of spaced feeding members, a pair of can chutes or guides, intermittent movable notched wheels for feeding cans from said can chutes to a point opposite said feeding mechanism, a cutter, and means for actuating the same in timed relationship to the movement of said feeding mechanism so that the cutter will swing from adjacent one feeding mechanism to the other so as to alternately cut the material being fed by the respective feeding mechanism.

In testimony whereof I have signed my name to this specification in the presence of two subscribing witnesses.

AUGUST M. AUGENSEN.

Witnesses:
  GEO. W. CARR,
  BARBARA DUERR.

Copies of this patent may be obtained for five cents each, by addressing the "Commissioner of Patents, Washington, D. C."